Oct. 9, 1962 J. I. HELLER 3,057,966

DIELECTRIC RECORDING AND PLAYBACK APPARATUS AND METHOD

Filed June 2, 1955 5 Sheets-Sheet 1

INVENTOR.
JOSEPH I. HELLER
BY R. K. Bumstead
ATTORNEY

Oct. 9, 1962 J. I. HELLER 3,057,966

DIELECTRIC RECORDING AND PLAYBACK APPARATUS AND METHOD

Filed June 2, 1955

5 Sheets-Sheet 2

INVENTOR.
JOSEPH I. HELLER
BY R. W. Bumstead
ATTORNEY

Oct. 9, 1962 J. I. HELLER 3,057,966

DIELECTRIC RECORDING AND PLAYBACK APPARATUS AND METHOD

Filed June 2, 1955 5 Sheets-Sheet 3

INVENTOR.
JOSEPH I. HELLER
BY [signature]
ATTORNEY

DIELECTRIC RECORDING AND PLAYBACK APPARATUS AND METHOD

Filed June 2, 1955

INVENTOR.
JOSEPH I. HELLER
BY R. W. Bumstead
ATTORNEY

INVENTOR.
JOSEPH I. HELLER
BY R. W. Bumstead
ATTORNEY

United States Patent Office 3,057,966

Patented Oct. 9, 1962

3,057,966

DIELECTRIC RECORDING AND PLAYBACK APPARATUS AND METHOD

Joseph I. Heller, Brooklyn, N.Y., assignor of one-half to Murray Pfeferman, Brooklyn, N.Y.

Filed June 2, 1955, Ser. No. 512,768

10 Claims. (Cl. 179—100.1)

This invention relates to recording and reproducing apparatus and to a method of translating electrical signals into delayed sound effects or other intelligence through the use of a dielectric recording medium. The invention involves a novel technique wherein a signal input circuit is caused to produce variations of electrostatic charge on a moving sheet or tape of dielectric material. Such a tape, for example, will, when passed through a recording head, store a trail of electrostatic charges. The trail of charges picked up at the recording head corresponds with the signal train. This trail, therefore, serves to control a subsequent deposit of powder particles which is laid down on at least one side of the dielectric material. The powder is deposited in varying amounts along the trail as a function of the stored electrostatic charges. Pulverized titanium dioxide is quite suitable for this purpose because of its extremely high dielectric constant. A further step of the process is preferably to pass the powder-conveying sheet or tape under a gentle air spray in order to remove all powder not held by its attraction to the charged surfaces.

When the recording is thus produced, it can be preserved in any one of several ways and used repeatedly for playback purposes. One method which renders the record substantially permanent is to pass it between heated rollers, where a second tape is brought into laminar association with it. The rollers then cause the two tapes to be heat-sealed together and to sandwich the powder between them. Other methods of giving permanence to the record may be adopted if desired, explanations with regard to these alternative methods being reserved for a subsequent part of this specification.

For playback purposes a tape recording, produced in the above-described manner, may serve as the dielectric in a variable capacitor constituting part of a resonant circuit. This tape, carrying its impounded powder trail, is passed between two electrodes which complete the formation of a variable capacitor. The playback circuit then operates by virtue of capacitive variations, in contrast with inductive variations such as are produced by magnetic tape. I have found the dielectric variations to be advantageous in several respects. Without loss of fidelity, closer packing of the information longitudinally of the tape is possible, even with reduced tape speed. Furthermore, the playback equipment can be materially simplified and its cost correspondingly reduced. Reduced tape speed results in lowered cost of tape per hour of recording, and economy of storage space for tape records which have to be preserved.

It is a primary object of my invention to provide a system for signal recording on a dielectric medium, such as uncoated plastic tape, where the process includes the formation of a trail of electrostatic charges along the tape corresponding to a given train of input signals, this trail being then used to control a deposition on the tape of variable amounts of comminuted powder material having an appropriate dielectric constant. A dielectric recording made in this manner may be made permanent by fixing the powder trail in situ by one or another of several available process steps.

Another object of my invention is to provide a signal recording and playback system of the above-described type wherein the record tape and a suitable playback circuit may be operatively associated for reproducing a given signal record.

Other objects of my invention include the provision of a dielectric tape recorder the characteristics of which are made suitable for high frequency and high fidelity recording, even with reduced tape speeds.

Permanency of the record is another object to be attained. This gives the tape freedom from accidental erasures.

Again it is an object to provide a tape record and a playback system which facilitates reproduction by the use of frequency modulation receiving techniques.

Again it is an object to provide means in a tape recorder for automatically controlling the speed of the tape as fed through a playback head in accordance with the recording speed, this being accomplished for example by the use of a selsyn motor, which is controlled by the carrier wave of the input signals as applied to the recorder.

Another object of the invention is to provide a recording system in which a reduction of tape speed results in a reduced cost for a given period of recording time.

Again, it is an object to provide a recording system which, without change of its adjustments, will accommodate the recording of signals over a very wide range of frequencies, say from D.C. to many megacycles.

And then, it is an object of my invention to provide a novel system of dielectric tape recording wherein the recording head is arranged to apply static charges of varying magnitude along the tape in response to ionic and/or electronic discharges from a signal input electrode, these discharges being formed as a thin web transversely of the tape, so that, as the tape travels past this web it will receive a recording of variable dielectric charges corresponding to the train of input signals.

An advantageous feature of my invention is to be noted in that a choice of carrier frequency for signal recording can be made to center on requirements for playback through existing equipment, such as in radar, FM systems, television IF, and other very high frequency systems, including those which use microwaves.

Due to the fact that my novel dielectric recording process enables a permanent record to be delivered in finished form after only a second or two following issuance from the recording head, it is possible to very greatly reduce the time lag between recording and playback, in comparison, for example, with optical systems where developing of a film record might be required.

My invention will now be described in more detail, reference being had to the accompanying drawings wherein, FIGURE 1 shows diagrammatically a recording and laminating process wherein one tape first receives a dielectric recording and is then overlayed by and sealed to a second tape for making a permanent record;

*The Recording System*

Figure 3:
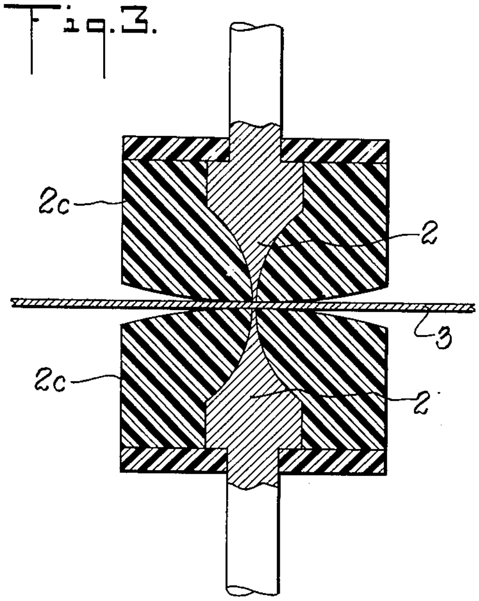
FIG. 3 shows in cross-section one form of recording head having razor-edge electrodes between which the dielectric tape is passed for static charge recording of input signals.
Figure 4:
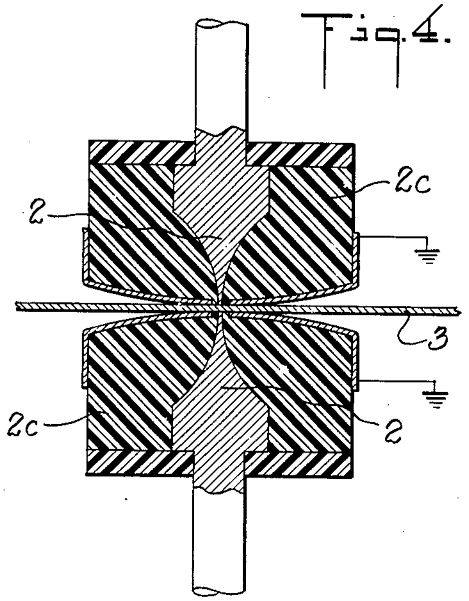
FIG. 4 shows in cross-section a recording head similar to that of FIG. 3, but with the addition of metallic shielding about the insulating material in which the electrodes are embedded.
Figures 5, 6, 7:
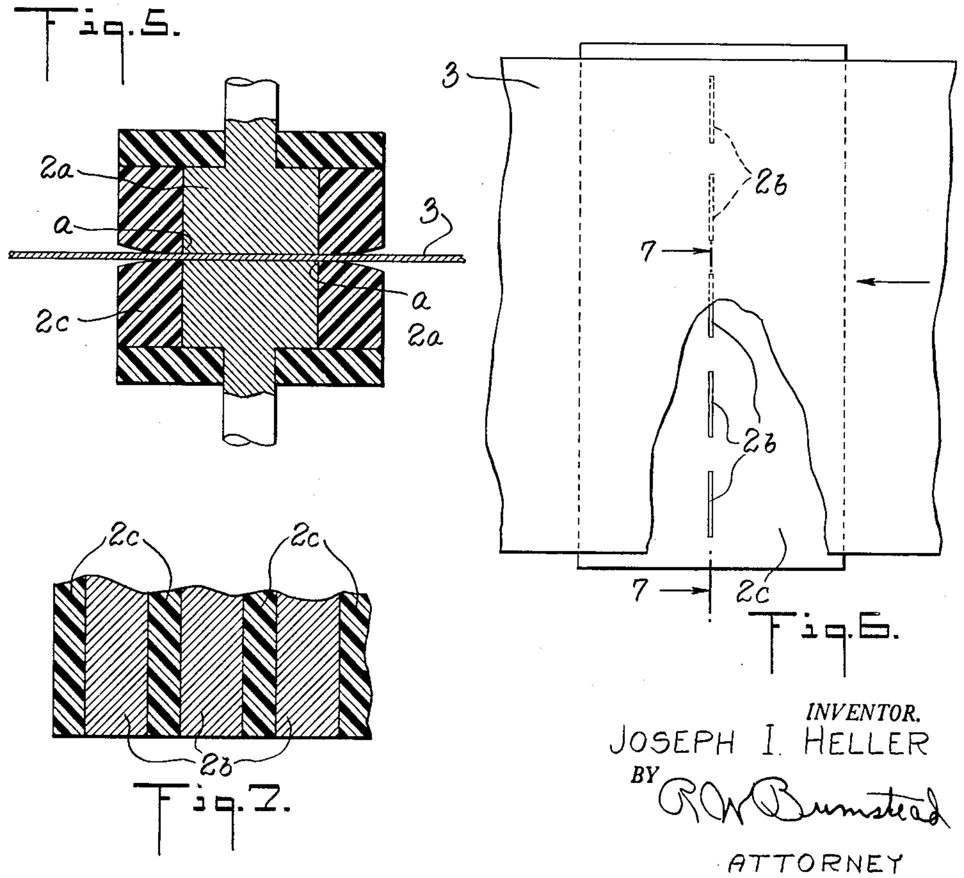
FIG. 5 shows in cross-section a modified form of recording head wherein the electrodes present relatively large face areas to the dielectric tape.
FIG. 6 is a plan view of a piece of tape here shown to be passing over a transverse array of electrodes which serve for simultaneous multiple track recording.
FIG. 7 shows a fragmentary transverse section along the plane 7—7 of FIG. 6.

My dielectric recording system differs considerably from one in which magnetic recording techniques are adopted. There are certain analogies, however, which will be apparent to those skilled in the art. The recording head 1 (FIG. 2) in the system herein disclosed usually comprises two electrodes 2 across which the signal voltage is impressed. Between these electrodes a dielectric tape 3 is moved at a constant speed. This tape may be any one of the well known plastics but it is not coated as in the case of a magnetic tape. Preferably the dielectric tape is thinner than would be used in magnetic recording. The electrodes 2 between which the tape is passed can be either be of razor edge as shown in FIGS. 3 and 4 or they can be of blunt faced formation as shown at 2*a* (FIG. 5). For single track recording the electrodes 2 and 2*a* would normally reach substantially across the width of the tape. If, however, it is desired to have multiple track recording, say for use in the recording of code signals, then a multiplicity of pairs of electrodes 2*b* would be required. These pairs are presented transversely across the tape 3. The electrodes 2, 2*a* or 2*b* are preferably jacketed with insulating material 2*c*. The razor edges of the electrodes 2 protrude through the jacketing, but, being flush with the outer surface of the latter, are not allowed to scratch or otherwise damage the tape 3.

If electrodes 2*a* were chosen to have blunt faces as shown in FIG. 5, it will be apparent that the voltages impressed across opposed electrodes would, to a large extent, cancel out except just at the electrode edges where the tape moves away from the zone of influence of the flat electrode faces. At the corners *a* where the tape leaves the field of the signal voltages, the stresses which then exist in the tape will remain at least for a sufficient time so that they will influence the deposit at a later stage of the powder which is to vary or change the overall dielectric constant of the finished record.

The subsequent step of the process as the tape 3 issues from the recording head 2 is preferably performed in a cloud chamber 4 (FIGS. 1 and 2) having an input orifice 5 and an output orifice 6. The tape 3 when drawn through this chamber receives a deposit or precipitation of minute particles of a powdered material. This process is also known as sublimation. The powdered material preferably has a high dielectric constant, K. Titanium dioxide as well as other materials meet this requirement. Furthermore it may be desirable to use comminuted particles of different materials suitably chosen from the triboelectric scale.

Without going into the question of the most advantageous choice of pulverized materials to be deposited on the tape 3, let it be understood that this deposit can readily be precipitated or sublimated so as to form a trail on at least one side of the tape. Different quantities of the powder will be clustered thereon by attraction to the more highly charged surfaces of the dielectric tape. Other portions of the tape which are not so highly charged will attract this powder in lesser degree, so that the surplus may be readily blown off, or scavenged.

Figure 9:
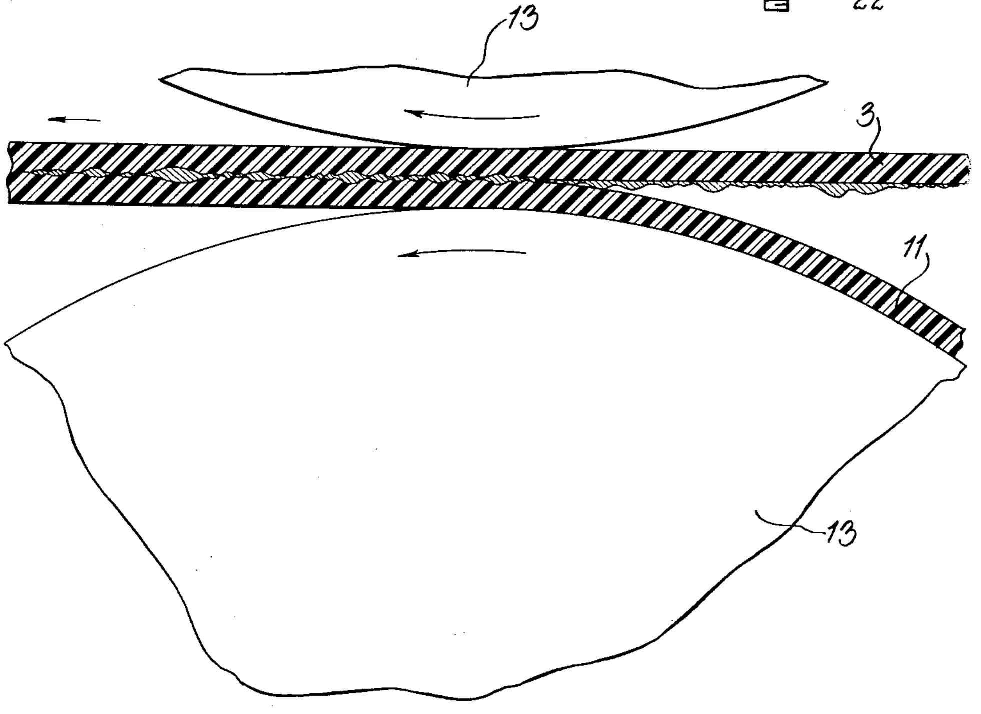
FIG. 9 shows on a greatly enlarged scale a longitudinal section of tape wherein the powder trail is being imbedded between two plastic tape laminations and sealed therein by a hot rolling process.

In FIG. 9, which is a greatly enlarged longitudinal section of a strip of tape 3 as it is being rolled into laminar relation with and sealed to a second tape 11 by heated rollers 13, there is also shown an imbedded course of powder clusters, or variable thicknesses of a continuously distributed trail of powder. It will be understood by those skilled in the art that this powder trail will be differently characterized according to the type of signals to be recorded. Thus, for example, if an amplitude-modulated signal is to be recorded, then the signal voltages of continuously variable amplitude will produce continuously variable dielectric stresses in the tape and will cause the powder trail to be continuously variable in thickness longitudinally of the tape. FIG. 9 illustrates roughly this type of recording.

It will be obvious without illustration that the tape recording may comprise a trail of powder clusters of substantially uniform thickness, but separated by spaces along the tape where substantially no powder adheres to it, as where the signal spacing registers no appreciable dielectric stress. This type of recording would prevail in the case of reception of incoming code signals of mark and space characterization. The discrete powder clusters representing the mark pulses might readily be observed by the human eye in the case of a recording of such code signals.

Another type of recording would prevail for frequency modulation signals. In this case the powder clusters would be of substantially uniform thickness because of the uniform amplitude of a frequency-modulated wave. The spacing between voltage peaks of such a wave, however, would cause variations of longitudinal spacing of the powder clusters along the tape. Such spacing would, of course, be of microscopic proportions compared with the spacing of code signals, but its suitability as a recording of frequency-modulated signals may readily be understood.

The underside of the tape 3 can, if desired, be swept clean by means of brushes 7. It will be understood that the choice of powder for use in this connection should be one wherein the particles themselves are very, very minute, say of the order of less than one ten thousandth of an inch in diameter. Such particles will, of course, be easily carried in suspension in the atmosphere of the chamber 4. The powder-laden atmosphere may be circulated between this chamber and a container (not shown) having therein a replenishing powder supply. The circulation is obtained by means of a pump 8, which, according to FIG. 1, has an intake pipe connection 19 for sucking air out of the chamber 4, and an output pipe connection 20 for blowing the air into the chamber 4 through nozzles 10 and 10*a*. This arrangement may suggest that the above-mentioned container for powder replenishment may be unnecessary, since a sufficient powder supply held in the bottom of the chamber 4 can readily be agitated by a blow through nozzle 10*a*. A desirably gentle degree of atmospheric turbulence is provided by the air flowing out from the nozzles 10 and 10*a*. Nozzle 10*a* is directed toward the powder supply in the bottom of the chamber 4. The hooded vents 9 are suitably arranged for exhausting the air from the chamber 4 so as to minimize losses of the powder into the ambient atmosphere. These vents are connected to the pipe 19 entering the pump 8.

Figure 2:
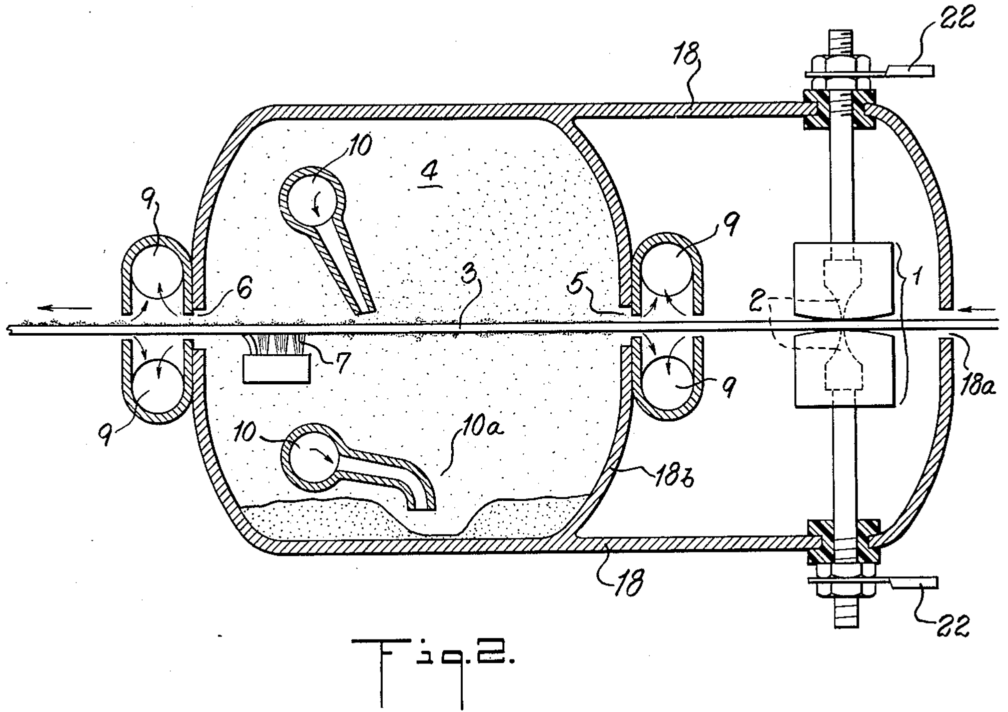
FIG. 2 shows in longitudinal section a preferred form of cloud chamber through which the tape is passed for receiving a powder trail, whereby a dielectric record is formed.
Figure 8:
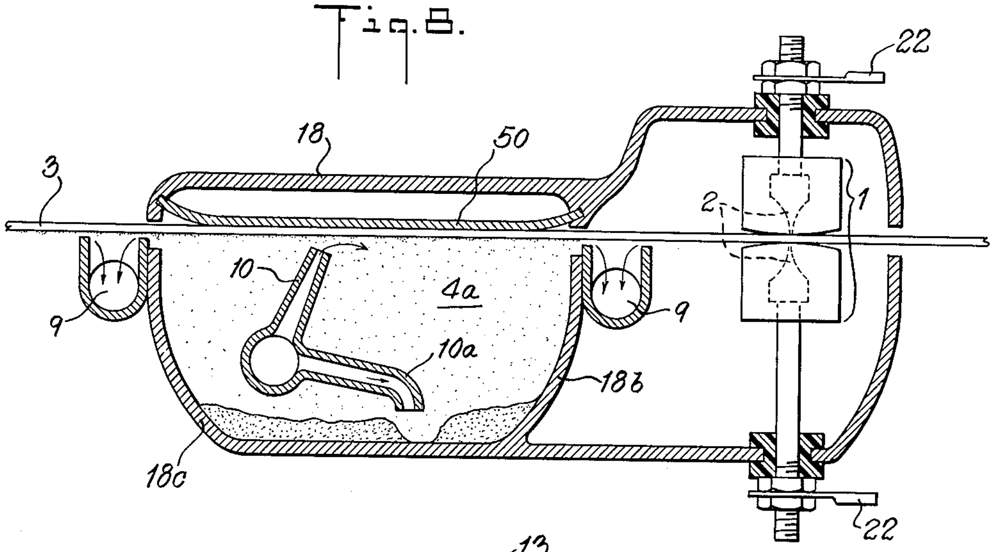
FIG. 8 shows diagrammatically a modification of the arrangement of FIG. 1, the recording and laminating process being here inverted so as to allow a powder trail to be deposited on the under side of the first tape and then sealed in place by an underlying second laminar tape.

In FIG. 8, I show a modified arrangement with respect to that of FIG. 2. Here the tape 3 travels over guide members which maintain its position practically in contact with a stationary ceiling plate 50 at the top of the chamber 4. The plate 50 may be fastened to the upper wall or roof of the housing 18 in any suitable manner.

A desirable feature of the arrangement shown in FIG. 8 is that powder does not settle on the tape 3 by gravitation, but is attracted to the underside thereof only where the dielectric stresses represent signal recordings. Furthermore, the tape travels so close to the ceiling plate 50 above it that substantially no powder reaches the upper side of the tape. Thus, there may be no need for the brush 7 (FIG. 2) to sweep the side of the tape that does not carry the record. The plate 50 may, therefore, be considered means for preventing the deposit of powder on the tape surfaces other than as wanted for signal recording.

Figure 1:
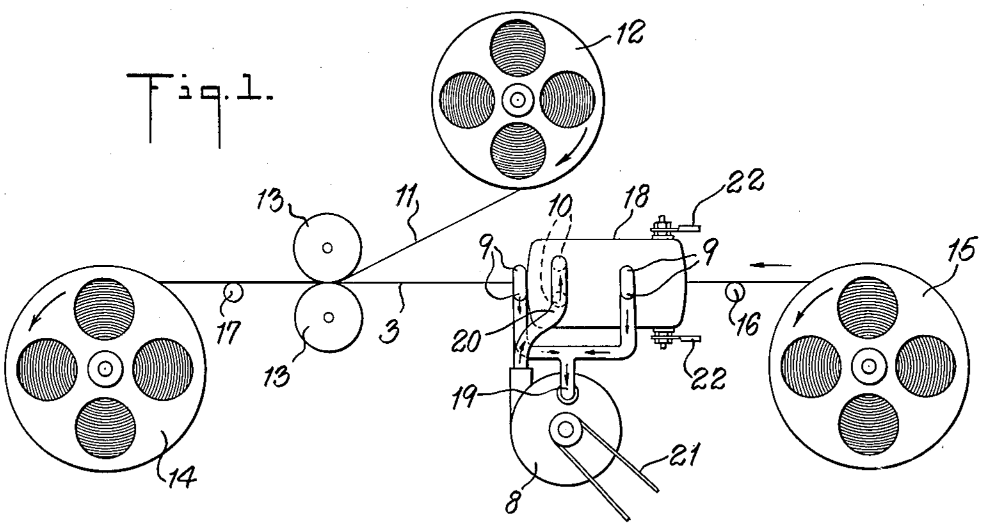

In order to make permanent my dielectric tape recording, a preferable process is to combine the tape 3 with a second tape 11, bringing these two tapes together in laminar relation with the powder trail sandwiched between them. FIG. 1 shows the tape 11 as being unwound from a reel 12. If, however, the modified arrangement of FIG. 8 is to be used for powder trail formation, then it will be understood that the tape 11 must be brought up from the underside of tape 3 and so laminated therewith. In either case both tapes are fed through rollers 13 which are preferably heated so as to seal the tapes together. The laminar tape thus finished makes a substantially permanent record, and one not subject to accidental erasure like magnetic tape. A take-up reel 14 (FIG. 1) is used to wind up the finished tape. From the reel 14 the tape may then be re-wound conventionally for playback purposes, or it can be stored immediately on the reel 14.

As another modification of my process, the second tape 11 may not be used, but in place thereof one may use a spraying or sublimation process for fixing the powder trail in contact with the tape 3. This and equivalent substitute methods are well known in the art and may be adopted according to preference.

With respect to any of the alternative embodiments thus far described it should be mentioned incidentally that a supply reel 15 is used for delivering the tape 3 to the recording head 1 and thence to the chamber 4 where the powder is deposited on the electrostatically charged portions of the tape. Guide rollers 16 and 17, or grooved posts in place thereof, may be provided, as is common practice, for maintaining a proper course for the tape 3 as it travels toward the recording head and as it issues from the rollers 13 and is thereupon wound up on the take-up reel 14. The guide roller or post 16 directs the tape in a fixed plane as carried to the recording head 1 and thus avoids tape friction at the port 18*a* in the wall of the container 18. This container 18 houses the basic components of the recording equipment and provides support for the two electrodes 2 of the recording head. Container 18 has within it the chamber 4 for holding the atmosphere that is beclouded with the high-dielectric powder. A partition wall 18*b* separates the chamber 4 from that space within the container 18 where the recording head 1 is mounted, this space being scavenged of powder by means of the exhaust ports 9 and pipe 19 leading to the pump 8.

Referring again to the guide roller or grooved post 17, this member serves to maintain constant the extent of contact of the laminated tape with the heated rollers 13 during the sealing process. Uniformity of the sealing operation is thus rendered independent of the amount of tape that is wound on the tape-up reel 14.

Any suitable means may be employed for driving the rollers 13 at constant speed, also for driving the take-up reel 14 at appropriate take-up speeds, and for driving the pump 8 at a suitable speed. Motivating means for such purposes, while essential, are required for implementing the operation of my recording system. The provision of these means in any suitable way will be understood by those skilled in the art, so that a specific showing thereof in the drawing has been considered unnecessary. The belt 21 merely indicates one form of power drive for the pump 8, but, obviously, a common shaft for the rotor of the pump 8 and for the armature of a motor could be provided.

The application of a signal source (not shown) can be made by connecting an input circuit to the electrodes 2 of the recording head 1 through terminal lugs 22 of the input conductors. The nature of the input signals will be taken up hereinafter.

*The Multiple Track Arrangement*

FIG. 6 shows diagrammatically, and as an enlarged fragment in plan view, an arrangement of multiple electrodes 2*b* in a recording or playback head, where the tape 3 is wide enough to accommodate multiple track recordings. The electrodes 2*b* are imbedded in plastic insulation as shown in FIG. 3 or FIG. 4. Such insulation 2*c* appears as a block on the underside of the tape 3. A like mounting of electrodes 2*b* within an insulation block 2*c* will be understood to be provided on the upper side of the tape 3. FIG. 7 shows a fragmentary vertical section of the multiple-track electrodes 2*b* in one of these assemblies on either side of the tape.

*The Ionic, or Electronic Recording Head*

Figure 10:
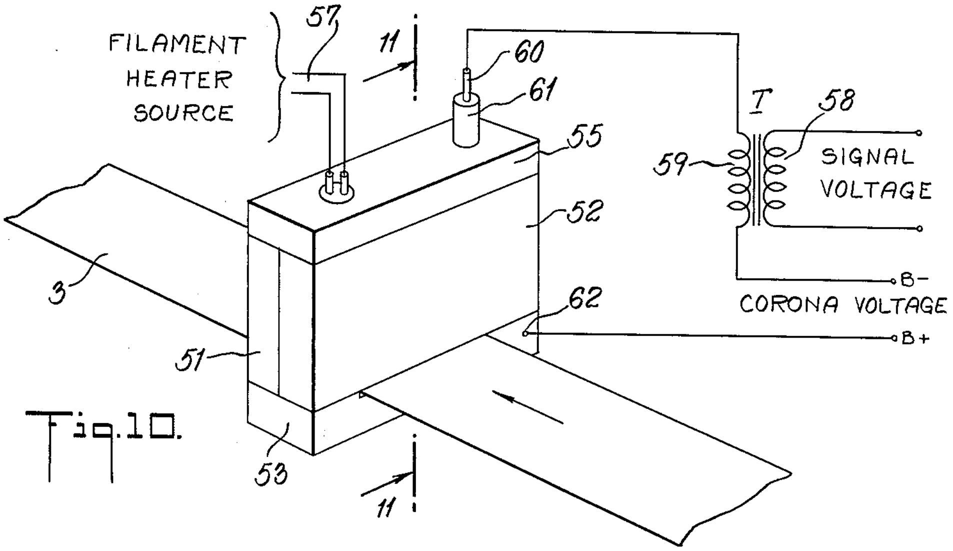
FIG. 10 is a perspective view of an ionic or electronic recording head which may be used to carry out one of the stated objects of the invention.
Figure 11:
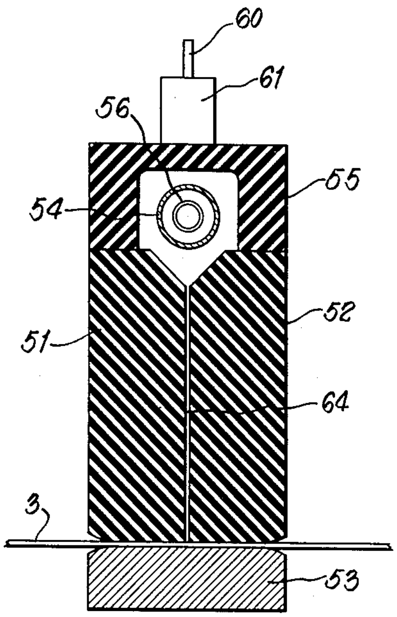
FIG. 11 is a section on the plane 11—11 of FIG. 10.
Figure 12:
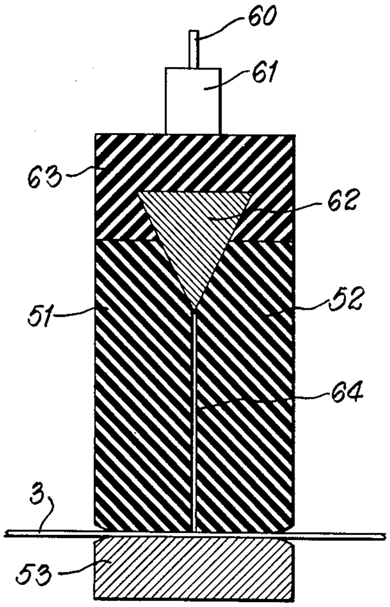
FIG. 12 is a modified section on the same plane 11—11 of FIG. 10.

Referring generally to FIGS. 10, 11 and 12, I show therein a novel principle of translating signals from a given source to an electrostatic recording on plastic tape. In FIG. 10, a perspective view of the recording head, it is assumed that the tape 3 travels from right to left between a system of two upper guide plates 51 and 52, and a lower electrode 53. The upper guide plates are of insulation, preferably glass or quartz. The electrode 53 is metallic. The plates 51 and 52 are spaced apart by a microscopic distance, say .00001″, more or less, depending upon the degree of resolution of the recording pulses to be distinguished on the record track of the tape 3, and upon the speed of the tape. The function of the plates 51 and 52 is to confine a flow of ions or electrons within such limits longitudinally of the tape travel direction as to obtain the desired resolution. Hence the thickness of a web-like electronic discharge may be suitably chosen in accordance with other parameters of the recording head.

In order to produce the electronic discharge above referred to and to do this so as to obtain a recording of signals electrostatically on the tape 3, I have mounted an input electrode 54 in the interior of a top cover member 55, and so arranged as to present an emissive surface in front of a V-notch at the upper edges of the plates 51, 52. If, as shown, the electrode 54 were to be cylindrical, then, conveniently, it may encompass a filament heater 56, for which current may be supplied through conductors 57 (FIG. 10) from a suitable filament heater source.

The input circuit shown in FIG. 10 is to be considered suitable with slight variations for producing a current flow through the web-like space between the insulation plates 51 and 52 and through the tape 3 to the anode 53; this flow being an electron discharge from a sleeve-like cathode 54 (FIG. 11) in one embodiment of the invention; otherwise, as shown in FIG. 12, the flow is that of a corona discharge through the same path, the current consisting chiefly of ions which result from the use of a corona voltage, 30,000 volts for example, between the cathode 62 and the anode 53. In FIG. 10, therefore, the legend "corona voltage" applies only to the embodiment for which FIG. 12 provides a cross-sectional view along the plane 11—11 of FIG. 10.

The embodiment which utilizes electronic emission requires only a conventional cathode-to-anode voltage source, say 200 volts, for example. FIG. 11 shows a heater element 56 disposed within the sleeve-like cathode 54. The cathode 54 is preferably coated with electron emissive material, at least on the surface which faces the V-notch between the plates 51 and 52.

A transformer T (FIG. 10) may be used for superimposing the signal voltage upon the cathode-to-anode voltage from a D.C. source, whether the latter is chosen for electronic emission or for generating a corona discharge. Transformer T has a primary winding 58 through which the signal voltage is impressed, and a secondary winding 59 which is traversed by the direct current and which inductively derives the signal voltage. For operation to produce a corona discharge the transformer T must be designed to safeguard its secondary winding 59 against break-down of its insulation and possible jump-over of current into the primary winding. The terminal 60 for cathode 54 is provided with a protective insulator 61.

High resolution and avoidance of the so-called "fringe-effect" are to be had in the operation of either of the systems described and shown with reference to FIGS. 10, 11and 12. A distinct advantage is thus gained as compared with systems of magnetic recording. The dielectric stress variations extend directly through the tape, whereas, in magnetic recording the effects of magnetization on a coated tape are more on the surface and are not confined to the distance between the two pole pieces of the recording magnet.

The ionic recording head version shown in FIG. 12 differs from the one shown in FIG. 11 chiefly in that the web-like air space between the plates 51 and 52 is activated by ionization, or a corona discharge, without the aid of electronic emission from a heated cathode.

In FIG. 12, which may be considered a cross-section of FIG. 10 through the line 11—11 thereof, the electrode 62 is disposed in the V-notch between the two insulating plates 51 and 52 and has a sharp edge at the upper end of the air gap 64. This gap 64 is of microscopic thickness between the insulators. By varying the magnitude of the corona discharge in response to the incoming signals it will be seen that this arrangement is quite favorable to high fidelity recording on plastic tape, and with high resolution at any practical tape speed. The cathode electrode 62 is shown to be enclosed within the insulator members 51, 52 and 63, and is preferably of triangular cross section, although that shape is by no means essential. The cathode connection is through a terminal 60, the same as in FIG. 11, and this terminal is preferably surrounded by an insulator 61 because of the very high D.C. voltage which is required for obtaining the corona discharge. A potential of at least 30,000 volts is envisioned for practical operation, but I do not intend that any limit be imposed on the use of my invention with respect to a supply of greater or lesser potentials.

*The Playback System*

Figures 13, 14:
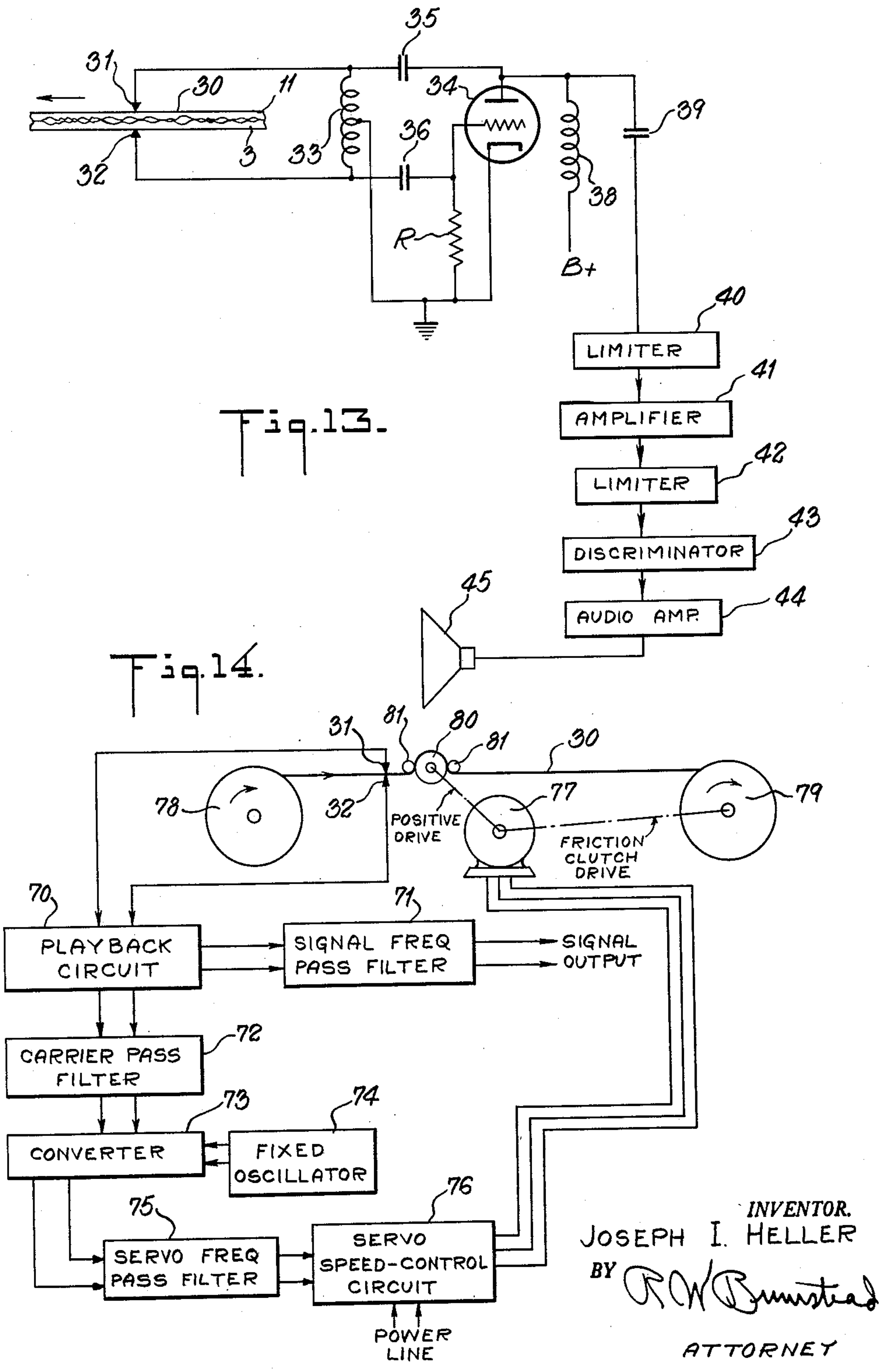
FIG. 13 is a diagram of a suitable playback circuit.
FIG. 14 shows diagrammatically an arrangement for speed control of a playback apparatus, where the speed is governed by the pick-up of a carrier-wave component, or an I.F. component of the recorded signal.

Referring now to FIG. 13, I show therein a useful playback system, which, however, in this specific form may or may not be incorporated within an embodiment of my invention, depending upon the ultimate use to be made of my novel dielectric record tape, or other recording medium. Other playback circuit arrangements may be employed if desired. They might be chosen, for example, if a more direct control of a responsive device were found to be preferable than through a frequency modulation receiving circuit as here shown.

In FIG. 13 there is shown a piece of finished laminated tape 30 being drawn at constant speed through a playback head having an upper electrode 31 and a lower electrode 32. The tape 30 will be understood to be produced in the manner set forth above. That is to say, the tape 30 is composed of two laminar portions 3 and 11 between which is the powder layer that was formed to characterize the dielectric recording of input signals.

The electrodes 31 and 32 in combination with the intervening tape 30 constitute a variable capacitor. The capacitance variability has a range which depends upon the varying amounts of powder that have been deposited and impounded between the laminations, and also depends upon the choice of powder material with which the atmosphere in the chamber 4 is beclouded. This material has, preferably, a very high dielectric constant. Pulverized titanium dioxide fulfills this requirement satisfactorily, although other elements, or combinations of elements are known to be suitable. Assuming that the spacing between the electrodes 31 and 32 is fixed so as to permit free passage of the tape 30 therebetween, but without needlessly large clearance, then the air dielectric will be minimized. Furthermore, the tape, assuming it to be of plastic material, will present a reasonably constant factor of dielectric value, its thickness being variable in negligible degree. The maximum degree of variability of the capacitive effect may, therefore, be understood to derive from the use of a powder material having the highest known dielectric constant; other considerations, such as cost, convenience of handling in the recording and other process steps being recognized for whatever practical worth they may contribute toward the design of a perfected embodiment of the invention.

At this point it may be well to consider the capacitive effects to be obtained by the use of the signal-characterized powder trail in relation to the overall capacitance of the playback head and what intervenes between its electrodes. Therefore, a short digression from the circuit description relating to FIG. 13 will direct us again to FIG. 9. In FIG. 9 it will be noted that after the tape laminations are rolled through the rollers 13, the applied heat tends to soften the plastic so as to allow the harder powder material to imbed itself in pockets, or depressions of the plastic surfaces. This action is desirable because the powder clusters cannot be displaced after sealing. Furthermore, the powder, if its substance is properly chosen for this technique, has a much higher dielectric constant than the tape, and therefore, tends to increase the capacitance when passing through the electrodes of the pick-up head proportionally to the thickness of the powder deposit. Thus, the translation of signal recordings to useful reproductions is made possible in an advantageous manner by causing the powder trail to displace plastic material having a lower dielectric constant. So far as possible, the process is designed to maintain the overall thickness of the laminations plus the powder trail constant, or substantially so.

In the preceding paragraph I have described a process of rolling the heat-softened plastic laminations so as to allow the harder powder material to imbed itself in pockets. My further statement in that paragraph that "the process is designed to maintain the overall thickness of the laminations plus the powder trail constant," taken in view of my earlier statement regarding different comminuted materials which may be chosen from the tribo-electric scale, leads to a consideration of what may be substituted for titanium dioxide in order to achieve the objects of my invention. Titanium is one of the metals and has therefore electrically conductive characteristics, differing, generally from those of other metals. Whatever may be that difference with respect to some substitute comminuted material to be imbedded between the plastic tape laminations, it is apparent that, in any case, the powder trail which is deposited and impounded in varying amounts between the laminations will cause a variation of capacitance between the electrodes of the reading head. This is due to the fact that the powder trail, acting as a conductor, interconnects two thicknesses of plastic tape each of which is inherently a dielectric. The overall capacitance between the electrodes is thus varied by the thickness of the dielectrics.

This aspect of my invention is of importance since it tends to broaden the scope. That is to say, I am not limited ot the use of titanium dioxide as a powder trail, but comminuted material having greater or lesser conductivity may be used.

When using the modified technique of spraying or of sublimating the record tape with a fixer in order to preserve the powder record, it is to be expected that minor differences of overall thickness of the finished tape will exist. Since, even under these conditions, the powder trail displaces an air space, measured between the electrodes of the playback head, there is no appreciable loss of efficiency of the dielectric recording as used for playback purposes.

Returning now to FIG. 13, the variable capacitor 30, 31, 32 as described in one of the preceding paragraphs is connected across an inductance coil 33 and forms therewith a resonant circuit. The tape 30 moving between the electrodes 31, 32 of the pick-up head causes this resonant circuit to be variably tuned to different frequencies. A vacuum tube 34, or equivalent electronic device, constitutes one component of a conventional oscillator circuit. Its cathode (preferably grounded) is connected to an intermediate point on the coil 33. The anode is coupled through capacitor 35 to one terminal of coil 33. The other terminal of this coil is coupled through capacitor 36 to the control grid of tube 34.

A grid resistor R interconnects the control grid and the cathode of the vacuum tube 34. Anode potential is supplied to the anode of tube 34 from a suitable D.C. source indicated as B+, and carried through an inductance coil 38. It will, of course, be understood by those skilled in the art that this circuit is only illustrative of many from which the necessary components of a useful oscillator may be chosen and constructed. Other types of vacuum tubes may be adopted. Other circuit arrangements may be employed.

The playback circuit herein shown for purposes of illustration corresponds basically to a receiving system for utilizing frequency modulated signals. It is assumed that the recording to be played back is one in which the carrier wave and the useful signal by which the carrier is modulated are both present. This condition is not essential except in certain applications of the invention. The arrangement is advantageous, however, where automatic speed control of the playback system is desired.

To follow through with the above assumption, therefore, the tuning of the oscillator circuit should be such that its frequency may normally lie midway of the band occupied by the modulated carrier wave. Alternatively, the recorded tape 30, as fed through the playback head, may hold an impounded powder trail which is characterized as a modulated intermedate frequency signal. Still again, the recording on this tape may be that of the intelligence signal alone, that is, the demodulation from which the carrier and/or the I.F. component have been removed. In such case the details of a suitable playback circuit would not need to be as elaborate as is shown in FIG. 13. Limiter and discriminator components would not be required, but, generally speaking, some form of detection would be needed if the recording is that of a modulated wave. Also, depending upon the ultimate utilization of the playback circuit, the signals carrying intelligence may or may not be within the audible range. They might pertain to radar or television, or to computing equipment, for example.

FIG. 13 shows further details with regard to a useful playback circuit operating on frequency modulation principles. The output from the oscillator tube 34 is coupled through a capacitor 39 to a limiter device 40, which in turn has an output circuit coupled to an amplifier 41. This amplifier leads to a second limiter 42 and thence to a discriminator 43 the output from which can be made intelligible by means of an audio amplifier 44 and, say, a loud speaker 45.

In case my improved dielectric recording system were to be adapted for the recording of amplitude modulation signals, either with or without a carrier, then other components would be chosen for the playback circuit than as herein shown. A heterodyne receiving circuit could be used either for deriving the audio signals alone to be recorded, or the modulated carrier might be recorded and in the playback circuit demodulation means of any well known type would be substituted for the limiters and discriminators. All of these substitute techniques will be readily understood by those skilled in the art and need no further discussion in the specification.

It will be apparent from the foregoing discussion of my improved playback circuit that in whatever form the components and the assembly of the same may be set up, the operation of such a circuit provides a very advantageous translation of recorded signals into recognizable intelligence. The variations of amounts of the powder in the dielectric powder trail sealed between the laminations of plastic tape causes corresponding variations to be made in the frequency of the oscillator circuit 30, 31, 32 and 33, and this frequency variation serves to vary output voltage as applied to the audio amplifier 44 and as delivered to the loud speaker 45. The powder trail may be varied either with respect to thickness, or with respect to the density of clusters of uniform thickness, that is, with respect to the packing factor.

*The Playback Speed-Control Circuit*

The diagrammatic showing in FIG. 14 is now referred to by way of explaining a useful speed-control apparatus the function of which is to compensate for possible departures of the playback speed from the recording speed of tape feed mechanisms.

In FIG. 14 there is shown a tape 30 which will be understood to carry a dielectric recording the same as described above in reference to FIG. 13. The playback head has two pick-up electrodes 31 and 32. The tape is drawn between these electrodes, being unwound from a reel 78 and wound onto a take-up reel 79. A conventional capstan 80 carries the tape at substantially constant speed. The tape 30 is held in frictional engagement with the periphery of the capstan by guide pins or rollers 81.

A motor 77 serves to drive the capstan 80 positively, and to drive the take-up reel 79 through a friction clutch so that compensation may be had for the varying speeds at which the take-up reel must rotate while it is being filled up with tape convolutions.

For purposes of speed regulation of the motor 77, it may be assumed that the recording on the tape 30 comprises not only the intelligence which is to be reproduced, but also a carrier wave component of which the signals representing intelligence are a modulation. On this assumption the playback circuit is illustratively described as follows, and with the further assumption that the recorded signals are constituted as a train of amplitude modulated carrier waves.

The electrodes of the playback head are connected to the input terminals of a conventional playback circuit 70 which may be of any well-known type, and which, of course, includes an electronic amplifier, and demodulation means. Two filters 71 and 72 are used to separate the signal frequency from the carrier frequency. Filter 71 is designed to pass the signal frequency, its pass band being whatever is suitable for the type of signals that are recorded. Its output circuit (labeled "Signal Output") is intended for general utilization and needs no further explanation. Filter 72 passes only the carrier frequency, whatever that may be. Its output is connected to a converter 73 where it is mixed with the output from a fixed frequency oscillator 74. This oscillator is preferably crystal-controlled or stabilized by other conventional means. A heterodyne frequency is derived from the converter 73 by virtue of the oscillator frequency adjustment. Thus, the frequency which may be used for speed control of a 60-cycle motor may be of the order of 60 cycles and would be derived from the mixing of the carrier wave with output from the oscillator 74, the oscillations from which differ from the carrier wave by normally 60 cycles. This difference frequency when used as input to a servo-frequency pass filter 75 and thence to a servo speed-control circuit 76 will fluctuate somewhat between practical limits either side of the normal 60-cycle frequency. The frequency variations represent changes in tape length between recording and playback times, or differences between the rate of tape feed of the recorder and of the playback apparatus. The function of the servo speed-control circuit 76 is to provide the desired compensation, or speed regulation of the playback tape drive motor 77.

Devices for motor speed regulation are well known and of different types, including those which operate by virtue of variable control of a resistance, a reactance, or of phase shift. Suitable connections between the component 76 and the drive motor 77 must be made, therefore, in accordance with the selection of circuit parameters for the servo circuit 76. The operation of the arrangement shown in FIG. 14 will now be explained by way of example, and on the assumption that the local oscillator frequency is chosen to be normally 60 cycles *above* the carrier frequency.

If the tape has stretched, the carrier signal will be lowered in frequency. The same would be true if the tape feed during playback happened to be for any reason slower than during recording. In either case compensation is needed so as to accelerate the playback motor 77. The lowered carrier frequency, being always below the frequency of the oscillator 74, represents a greater difference frequency as derived from the heterodyning process in the converter 73. The servo circuit 76 is, therefore, designed to respond to an increased frequency difference by causing the speed of the motor 77 to be accelerated. Obviously the speed-control function works both ways, so that the motor 77 will run at reduced speed when necessary. Furthermore, those skilled in the art can readily design the servo speed-control circuit 76 to operate properly when the motor *acceleration* is wanted in response to a *decreased* frequency difference derived from the converter 73, as would be the case when the oscillator 74 has a *lower* frequency than that of the carrier wave.

*Miscellaneous Aspects of the Invention*

For best results in the operation of my invention, the apparatus needs to be designed with due regard for the following factors of efficiency:

The tape should have high electrical resistance, especially on its surface, so as to inhibit the leaking off of static charges as applied by the recording head before they are utilized to attract the powder trail.

The tape should be as thin as possible without running the risk of breakage under practical conditions of handling and feeding through the sealing rollers, also during any of the necessary winding operations. The minimum thickness is desirable in order to reduce the space between the electrodes of the recording and playback heads, and thus to increase the overall capacitance between such electrodes.

The tensile strength of the tape need not be any greater than that usually obtained for magnetic recording, since the load would actually be less than in the usual tape transport. This reduction of the load is due to the greatly reduced speed of tape travel which is permissible.

The plastic tape for dielectric recording in accordance with my invention is obviously much cheaper than a tape which has to be coated with magnetic material. It is obvious that with lower recording speeds and reduced lengths of tape there is a very considerable cost reduction to be had.

Very high resolution, that is, high fidelity of recording, is possible even with lower recording speeds when my dielectric recording system is used, due to the fact that the sharpness of the electrodes 2 permits this high resolution.

The physical nature of the powder to be used is probably the most important single factor in the design of my equipment. Primarily it is required that the powder should possess an inherently high dielectric constant in order that it shall have the maximum range of variability of the condenser effect in the playback head. All other factors being equal, the greater the dielectric constant of the powder the smaller will be the needed quantity of powder which must be built up on the charged areas to achieve a given capacity variation as seen by the playback electrodes. Similarly, the lower would be the required area on the faces of the electrodes. The factors just recited bear directly on the frequency band, tape speed and the degree of distortion.

Again, the size of the powder particles must be small for the following reasons: (*a*) the particles must be light and small enough to allow easy "clouding." A reasonably small amount of air turbulence must readily create an atmosphere of powder dense enough to effectively blanket the previously charged tape; (*b*) Theoretically, the smaller the particles the greater will be the possible resolution between the charges. From a practical viewpoint it is probable that the charged areas for signal representation will never be as small as one particle. Nevertheless it still remains desirable to use particle sizes small enough to keep the edges of a charged area as clean and as sharp as possible.

Again it is to be desired that the physical characteristic of the powder shall be of a nature which would preclude clumping or caking since a powder disposed to caking would not cloud uniformly and would result in depositing powder on the charges which were considerably larger in area than that of the underlying charge.

*Comparative Considerations with Respect to Magnetic Recording*

My novel dielectric recording system may be readily understood to have considerable advantages over magnetic recording systems now available. Chief of these advantages are (*a*) extended frequency range, (*b*) permanence, (*c*) cost of apparatus for recording and reproducing, and (*d*) cost of the records.

With regard to the frequency range comparison, it is well known that the standardized magnetic tape recording speeds have been determined as a result of many years of experimental work and there is a relationship between frequency response and tape speed which is found to be somewhat as follows:

For frequencies up to 5000 c.p.s. the speed should be 3¾" per sec.

For frequencies up to 8000 c.p.s. the speed should be 7½" per sec.

For frequencies up to 15000 c.p.s. the speed should be 15" per sec.

While the precise frequency response differs quite markedly in the equipment supplied by various manufacturers of magnetic tape recorders, the values shown above can be taken as approximately average for the industry.

In magnetic recording systems many factors control the frequency response, the most important being the design of the head. Air gaps of .0005" represent the present limit since reducing the gap will in general produce no extension of the frequency range. The reasons ascribed to this limitation include the so-called "gap effect," magnetic particle size, and the phenomena which permits a reduced amount of magnetic material to be acted upon by the head as the frequency is raised. In other words, high frequency signals do not penetrate the magnetic oxide coating so deeply as the low frequency signals. At the present time no material change has been brought about in the limitations listed above nor is any marked improvement expected.

For greater frequency response requirements, therefore, the speed of the tape must be increased as seen in the high fidelity transcription work which is performed at tape speeds of 15 to 30″ per second and video recording which is performed at various speeds up to 100's of inches per second. The disadvantages of such high tape speeds are obvious. They include (*a*) magnetic strain on the tape, (*b*) high cost of the tape, and (*c*) storage and handling facilities.

The use of dielectric recording permits a greatly increased frequency range because of the unique way in which information is stored. The width of the static recording head (parallel to the direction of tape travel) is only a small fraction of the minimum gap length permissible on magnetic gap heads, therefore, effectively cancelling the limitations of the "gap effect."

In addition to the increased frequency range expected from dielectric recording because of the very small "gap effect," the use of static electrodes makes possible the shielding of stray charge fields so that the remanent charging field is still further restricted. This technique is illustrated in FIG. 4. A further explanation for the possibility of increased frequency range of dielectric recording rests in the complete absence of the depth effect which is inherent in magnetic recording. It has been found that in magnetic playback, of the usual longitudinal type, the magnetic coating is effective to a depth depending upon the frequency in adverse degree. That is, the higher the recording frequency, the smaller the dipole, and the lower is its effect on the pick-up head.

In the foregoing disclosure of my invention I have used for descriptive purposes one or more embodiments by way of example. The apparatus as described is at present preferred and gives satisfactory results. It will be understood, however, that various changes and modifications may be made by those skilled in the art when following the teachings of this disclosure, but without departing from the spirit and scope of my invention. It is intended, therefore, that all such changes and modifications shall be comprehended within the scope of the appended claims.

I claim:

1. A system for permanent dielectric recording of signals, comprising first and second plastic record members, means for moving said first record member (a recording head) for selectively imparting to said first record member as the same moves past said recording head electrostatic charges corresponding to the signals to be recorded, means for applying a material having a high dielectric constant in the form of a finely comminuted powder to one surface of said first record member so that said powder adheres selectively to the charged regions of said first record member in quantities corresponding at any given location to the magnitude of the charge at that location, and means for heat sealing said second record member to said first record member over all of said one surface thereof which carries said powder to confine said powder between said record members, whereby the dielectric constant of any given portion of the compound record is effectively determined by the quantity of said powder disposed at said portion between said first and second record members.

2. A recording system according to claim 1, said material of which said powder is made being titanium dioxide.

3. A system for permanent dielectric tape recording of signals, comprising first and second longitudinally movable plastic tape members, a recording head positioned adjacent the path of movement of said first tape member for subjecting the same as it moves past said recording head to electric fields corresponding to the signals to be recorded so as to form in said first tape member at least one trial of electrostatic charges corresponding to said fields and thus to said signals, means positioned adjacent said path of movement of said first tape member following said recording head for applying finely comminuted titanium dioxide powder to one surface of said first tape member so that said titanium dioxide powder adheres selectively to the charged regions of said first tape member in quantities corresponding at any given location on the latter to the magnitude of the charge at that location, said path of movement of said first tape member joining that of said second tape member to bring the latter into surface contact with said one surface of said first tape member which carries said titanium dioxide powder subsequent to movement of said first tape member past said powder-applying means, and a pair of heated rollers disposed adjacent the combined path of movement of said first and second tape members for passage of the same between said rollers to permit said tape members to be heat-sealed to one another to a substantially uniform thickness of the compound tape with said powder confined between said first and second tape members and partly embedded therein, whereby the dielectric constant of any given portion of said compound tape is effectively determined by the quantity of said powder disposed at said portion between said first and second tape members.

4. A tape recording system according to claim 3, said recording head comprising at least one pair of opposed electrodes between which said path of movement of said first tape member passes, and means connected to said electrodes for applying across the same electrical voltages characteristic of said signals.

5. A tape recording system according to claim 4, said electrodes being positioned in close proximity to said path of movement of said first tape member and to the opposite faces of the latter as it passes between said electrodes.

6. A tape recording system according to claim 3, said powder-applying means comprising a chamber having entrance and exit openings through which said path of movement of said first tape member passes, a portion of said chamber constituting a reservoir for a supply of said titanium dioxide powder, pump means, first conduit means establishing communication between the pressure side of said pump means and the interior of said chamber, and second conduit means establishing communication between the suction side of said pump means and said entrance and exit openings exteriorly of said chamber, whereby operation of said pump means and the resultant flow of air through said first conduit means causes dispersion of said powder throughout the interior of said chamber to permit some of said powder to be attracted from its suspension in the chamber atmosphere to said charged regions of said first tape member, while excess powder is exhausted from said chamber through said openings and said second conduit means and recirculated into said chamber through said pump means and said first conduit means.

7. A system for permanent dielectric tape recording of signals, comprising first and second longitudinally movable plastic tape members, electrode means positioned adjacent the path of movement of said first tape member, means for applying voltages corresponding to the signals to be recorded to said electrode means for imparting to said first tape member as the same moves past said voltage applying means, electrostatic charges corresponding to said voltages and thus to said signals, means positioned adjacent said path of movement of said first tape member following said electrode means for establishing an atmosphere of finely comminuted titanium dioxide powder over said path of movement of said first tape member so that said titanium dioxide powder may be selectively attracted by and to the charged regions of said first tape member in quantities corresponding at any given point of the expanse of said first tape member to the magnitude of the charge at that point, said path of movement of said first tape member joining into that of said second tape member to bring the latter into surface contact with that face of said first tape member which carries said titanium dioxide powder at a location spaced from said powder atmosphere-establishing means in the direction of movement of said first tape member, and a pair of heated rollers disposed adjacent the combined path of movement of said first and second tape members for passage of the same between said rollers to permit said tape members to be heat-sealed to one another to a substantially uniform thickness of the compound tape with said powder confined between said first and second tape members and partly embedded therein, whereby the dielectric constant of any given portion of said compound tape is effectively determined by the quantity of said powder disposed at said portion between said first and second tape members.

8. A tape recording system according to claim 7, said electrode means comprising a pair of electrodes between which said path of movement of said first tape member passes and both of which are located in close proximity to the opposite faces of said first tape member as the latter moves along said path of movement thereof, to thereby cause electric fields corresponding to said signals to pass through said first tape member for charging the latter.

9. A tape recording system according to claim 7, said electrode means comprising a pair of electrodes between which said path of movement of said first tape member passes, one of said electrodes being located in close proximity to one face of said first tape member as the latter moves along said path of movement thereof, and the other of said electrodes being spaced relatively far from the other face of said first tape member, whereby the application of signal voltages across said electrodes causes corresponding bombardment of said first tape member by electrically charged particles traveling through the gap between said other electrode and said first tape member for charging the latter.

10. A tape recording system according to claim 7, said powder atmosphere-establishing means comprising a chamber having entrance and exit openings through which said path of movement of said first tape member passes, a portion of said chamber constituting a reservoir for a supply of said titanium dioxide powder, pump means, first conduit means establishing communication between the pressure side of said pump means and the interior of said chamber, and second conduit means establishing communication between the suction side of said pump means and said entrance and exit openings exteriorly of said chamber, whereby operation of said pump means and the resultant flow of air through said first conduit means causes dispersion of said powder throughout the interior of said chamber to permit some of said powder to be attracted from its suspension in the chamber atmosphere to said charged regions of said first tape member, while excess powder is exhausted from said chamber through said openings and said second conduit means and recirculated into said chamber through said pump means and said first conduit means.

References Cited in the file of this patent

UNITED STATES PATENTS

| | | |
|---|---|---|
| 1,715,863 | Pomeroy | June 4, 1929 |
| 1,859,551 | Chromy | May 24, 1932 |
| 2,221,776 | Carlson | Nov. 19, 1940 |
| 2,283,148 | Bruce | May 12, 1942 |
| 2,369,085 | Stone | Feb. 6, 1945 |
| 2,422,140 | Sinnett | June 10, 1946 |
| 2,473,729 | Salz | June 21, 1949 |
| 2,551,582 | Carlson | May 8, 1951 |
| 2,624,652 | Carlson | Jan. 6, 1953 |
| 2,716,048 | Young | Aug. 23, 1955 |
| 2,830,114 | Carlson | Apr. 8, 1958 |

FOREIGN PATENTS

| | | |
|---|---|---|
| 384,258 | Great Britain | Dec. 22, 1932 |